(12) United States Patent
Reis et al.

(10) Patent No.: US 7,109,425 B2
(45) Date of Patent: Sep. 19, 2006

(54) LOW ALTERNATING CURRENT (AC) LOSS SUPERCONDUCTING CABLE

(75) Inventors: Chandra T. Reis, Altamont, NY (US); Michael S. Walker, Albany, NY (US)

(73) Assignee: Superpower, Inc., Schenectady, NY (US)

( * ) Notice: Subject to any disclaimer, the term of this patent is extended or adjusted under 35 U.S.C. 154(b) by 108 days.

(21) Appl. No.: 10/381,124

(22) PCT Filed: Sep. 26, 2001

(86) PCT No.: PCT/US01/29971

§ 371 (c)(1),
(2), (4) Date: Jun. 4, 2003

(87) PCT Pub. No.: WO02/27735

PCT Pub. Date: Apr. 4, 2002

(65) Prior Publication Data

US 2004/0000421 A1    Jan. 1, 2004

(51) Int. Cl.
*H01B 12/00* (2006.01)
*B21D 51/16* (2006.01)
*B21K 1/02* (2006.01)
*B23P 17/00* (2006.01)

(52) U.S. Cl. ............... 174/125.1; 505/230; 505/430; 29/899

(58) Field of Classification Search ............ 174/125.1; 505/230–232, 430–432, 234; 29/899
See application file for complete search history.

(56) References Cited

U.S. PATENT DOCUMENTS

| 3,634,597 | A | | 1/1972 | Ziemek |
| 3,634,997 | A | | 1/1972 | Ziemek |
| 4,377,032 | A | * | 3/1983 | Benz ........................... 29/599 |
| 5,843,584 | A | * | 12/1998 | Raber ......................... 428/594 |
| 6,255,595 | B1 | * | 7/2001 | Metra et al. ............. 174/125.1 |
| 6,262,375 | B1 | | 7/2001 | Engelhardt et al. |
| 6,313,408 | B1 | * | 11/2001 | Fujikami et al. ......... 174/125.1 |
| 6,596,945 | B1 | * | 7/2003 | Hughey et al. .......... 174/125.1 |

FOREIGN PATENT DOCUMENTS

JP    06-044834    *    2/1994

OTHER PUBLICATIONS

Machine Translation of JP 06-044834.*

* cited by examiner

*Primary Examiner*—Kamand Cuneo
*Assistant Examiner*—Jeremy C. Norris
(74) *Attorney, Agent, or Firm*—Larson Newman Abel Polansky & White, LLP

(57) ABSTRACT

A low alternating current loss superconducting cable is provided, including a plurality of superconducting tapes spirally wound around a longitudinally extending core. The tapes are provided in a path between about 5° and 85° relative to the longitudinal axis of the core such that the tape completely covers the surface of the core. The tapes are generally parallel to each other and include first and second tapes that are adjacent to each other. The first and second tapes partially overlap each other.

10 Claims, 5 Drawing Sheets

LOW ALTERNATING CURRENT (AC) LOSS SUPERCONDUCTING CABLE

FIELD OF THE INVENTION

Background of the Invention

Electrical conductors, such as copper wires, form the basic building block of the world's electric power system, for both power transmission and distribution. The discovery of high-temperature superconducting compounds in 1986 has led to the development of their use in the power industry. This is the most fundamental advancement in conductor technology used for power systems in more than a century.

Over the past three decades, electric power use has risen about 25% –40% in the United States. With this rising demand for power comes an increased requirement for low-cost power. Because of the lack of DC resistance and the low AC losses of superconductors at operating temperatures, superconducting devices are being developed for application throughout the electric power industry.

The power industry's future use of superconductors depends on the overall cost and performance (low power loss) benefits that the superconductor wires offer. HTS tape technologies drive down the costs, increase the current-carrying capacity, and improve the reliability of the wiring system, thus impacting electric power systems in a variety of ways. These ways include the possibility of greatly reduced size and weight of the wires used in devices such as cables, transformers, motors, and generators. Superconductor wires have many applications because of their efficiency for carrying electricity and their ability to carry much higher electrical currents than other conducting materials in less volume.

There exists the unmet technical challenge in the power industry of fabricating HTS cables and devices in such a way that they operate with negligible alternating current (AC) losses. These superconductors can carry direct current (DC) with negligible losses, but DC is rarely used in the power industry. AC is the dominant form in most of the world's power cable-based devices. AC applications of HTS tapes operate with non-negligible energy losses, the energy escaping in the form of heat. This impacts the efficiency of the system beyond the mere energy loss since the heat generated must be removed from the environment of the device.

Superconductors operate in the temperature range of 4°–85° K, far below ambient temperature (298° K). Thus, superconductors require refrigeration, and refrigeration requires continuous expenditure of energy. For example, if the heat caused by the electrical current flowing in superconductor wires is at 77° K and is dissipated at the rate of one watt, then refrigerators must be supplied with approximately 10–40 watts of electrical power to dissipate that generated heat. Absent this refrigeration, the superconductor material would warm itself to above its superconducting temperature and cease to operate as a superconductor, thereby eliminating any advantage and, in particular, providing worse performance than conventional copper conductors.

The heat generated must be eliminated to cost-effectively maintain the low temperatures required by the superconductor. Successful solution of this problem would reduce operating costs by reducing the added cooling energy needed.

The key problem of HTS tapes is that unwanted AC magnetic fields are generated by the current flowing in the neighboring HTS tapes, which causes AC losses. Because the HTS tape material and geometry is anisotropic, magnetic fields passing perpendicular to the preferred direction generate significantly greater losses than those of parallel fields. In the present invention, there are no perpendicular magnetic fields except for the very ends of the wiring structures, where different loss mechanisms apply. A discussion of AC losses caused by magnetic fields can be found in W. T. Norris, J. Phys. D 3 (1970) 489–507, or Superconducting Magnets by Martin N. Wilson, Oxford University Press, Oxford, UK 1983.

It would be highly beneficial to develop a superconductor configuration that reduces AC losses and associated very high refrigeration costs. Practical devices for AC applications could then be wound using wide flat superconductors, the most prevalent and desirable form of high temperature superconductors (HTS).

Thus, it is an object of this invention to provide a method of fabricating superconductor cables such that AC losses due to the presence of a localized perpendicular component of the self-field is eliminated or minimized.

It is another object of this invention to provide superconducting cables with minimized AC losses due to the presence of a localized self-field perpendicular field component.

It is yet another object of this invention to provide a three phase cable consisting of three superconducting cables with minimized self-generated AC losses.

It is yet another object to reduce refrigeration requirements associated with the operation of a HTS tapes used in wiring cable-based devices by reducing the heat generated by perpendicular magnetic fields impinging on neighboring HTS tapes.

It is yet another object of this invention to use conventional HTS wiring tapes and conventional wiring methods in a new wiring configuration to create a low cost superconducting device.

BRIEF SUMMARY OF THE PRESENT INVENTION

HTS tapes may be wound around cable structures in various ways described as "winding configurations". Winding configurations can be changed in a variety of ways by changing (1) the size of the superconductor wires (width, thickness, shape) on the cable structure, (2) the type of superconductor material used, and (3) the way the tape is wound on a cable structure itself (spacing to its neighboring wire).

Surprisingly, it has been determined that eliminating the gaps normally present when superconductor tapes are wound into cables prevents significant energy losses and limits the need for cooling of the superconductor. The present invention obtains low AC loss results by providing novel techniques of winding the tape on a cable structure.

In most applications, the HTS tape is continuously in the presence of an AC field. The present invention is directed toward HTS tape-winding configurations used in applications where the AC frequency is typically in the range of 50–60 Hz (normal operating frequency in the power industry). By using HTS tapes instead of standard copper wires, better performance (lower power losses) and lower cost are achieved. However, HTS tapes require cooling, which uses power. The present invention is directed to HTS tape wiring configurations designed to achieve low AC losses, thereby reducing refrigeration requirements and enabling superconducting wiring structures to achieve their higher performance at lower cost.

A significant source of AC loss is the loss caused by the magnetic fields of the neighboring HTS tapes, said field being generated by AC current traveling through HTS tapes, in particular, the magnetic self-fields that are allowed to form because of gaps between the HTS tapes.

It has now been discovered the superconductors composed of conventional materials but wound in specified configurations eliminate certain energy losses commonly present in HTS applications. The invention applies broadly to a superconductor winding configuration that eliminates local perpendicular field components.

This new HTS tape configuration approximates a single current "sheet", which produces minimal magnetic fields perpendicular to the current flow, thus significantly reducing AC losses.

The invention comprises a method of fabricating superconducting cables that minimize the AC losses in the main body of the superconducting cable and low AC loss superconducting cables. The beneficial results of the invention are obtained by fabricating superconducting cables such that superconductors overlap one another so that gaps between the superconductors are covered by another superconductor.

Because there are no uncovered gaps, the individual turns of the HTS tapes approximate a single long sheet of current, forcing the magnetic field to be primarily parallel to the surface of the core and surface of the superconductor. This is a preferential orientation because it minimizes or eliminates the component of the magnetic field perpendicular to the surface of the superconductor. With no substantial perpendicular field component, the high perpendicular field losses in the superconductor are eliminated.

DETAILED DESCRIPTION OF THIS INVENTION

The present invention relates to superconductor tapes, fabrication methods and configurations that are designed to minimize the AC losses in a superconducting cable or assembly. Superconducting tapes of various compositions are well known. Suitable high-temperature superconductor tapes are for example Bi-2223 superconducting tapes, and include, but are not limited to, those superconductor tapes that are formed from any of the following families of superconductive materials: cuprates (such as YBCO or BSCCO), diborides, or metallic superconductors.

Suitable HTS tapes can be flat and can also be elliptical, or rectangular. HTS tapes are typically from about 0.001 mm to about 10 mm thick and from about 0.5 mm to as wide as convenient for the design of the superconducting assembly. The HTS tapes can be either monocore or multifilament, thin or thick film, powder-in-tube or surface-coated, or any variety of high-temperature superconductors where the final form is flat, elliptical, or rectangular.

A single layer of HTS tape may be used in the lapped embodiment of the invention; a minimum of two HTS layers are required to achieve the benefits of the invention in other embodiments, but it is possible to have as many layers as are required by design considerations.

The HTS tapes are wound on a "core" which is used to support the HTS tapes. The core is a flexible cylinder, hollow or solid. This core structure can range from 0.25 inch to several inches in diameter and can range from several feet to several miles in length. HTS tapes are preferably wound at a pitch angle of between about 5° and 85°, preferably at a pitch angle of between about 10° and 30°, relative to the longitudinal axis of the total core structure to create a cable and to maximize its effectiveness electrically and physically. HTS tapes can also be wound at different angles relative to the longitudinal axis of the core structure to create a cable with different electrical and physical requirements. The tapes are wound on the core using conventional fabrication techniques. Any conventional core can be utilized in the process; upon completion of tape wrapping the core may remain or may be removed.

These tapes are configured so that they overlap one another such that all gaps between HTS tapes are covered by another HTS tape. The HTS tapes are essentially parallel conductors terminated together at the ends of the superconducting cable.

Figure 1:
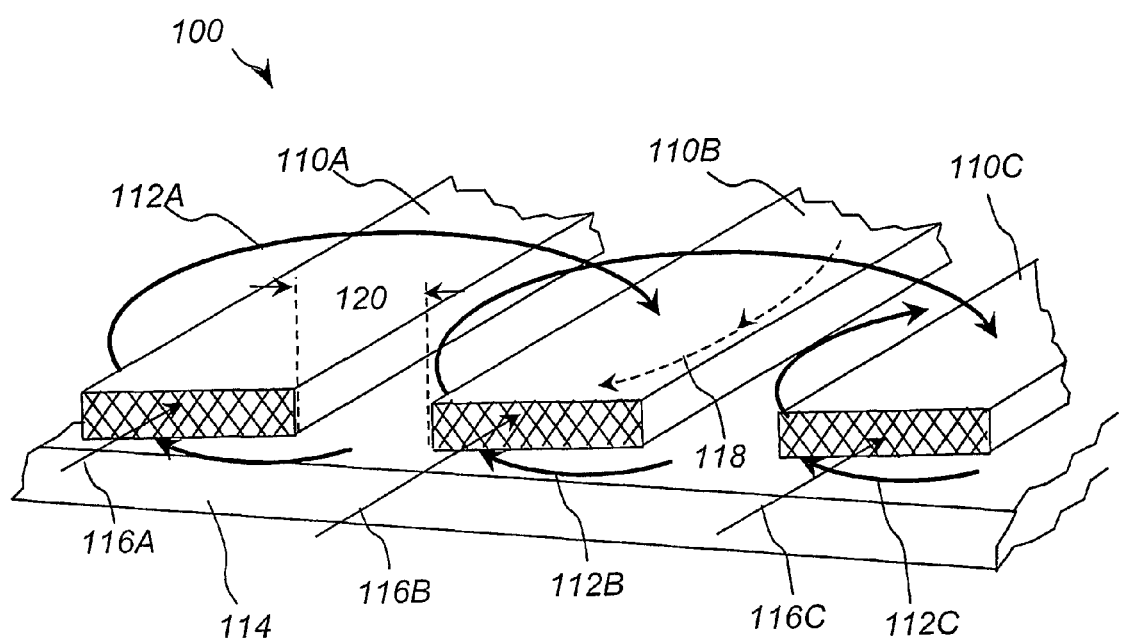
FIG. 1 is a magnified view of a typical prior art device illustrating the general effects of self-induced magnetic fields on an HTS tape.

FIG. 1 illustrates, in very general terms, how the high-temperature superconductor's wires or HTS tapes in the presence of magnetic fields create AC losses.

FIG. 1 shows an example of a general view 100 of prior art HTS tapes on a core. The core 114 is used to support the HTS tapes. A cutaway portion of three separate HTS tapes 110A–C is also shown. The core 114, shown in FIG. 1, is a small section of a total structure that HTS tapes 110A–C are wound around.

The electrical current direction flowing in each HTS tape 110A–C is shown as 116A–C, respectively. Current 116A flowing in HTS tape 110A shows the direction of a self-induced magnetic field loop 112A. Self-induced magnetic field loops 112B, and 112C are also shown for currents 116B, and 116C, respectively. Self-induced magnetic field loop 112A is shown to couple or cross HTS tape 110B. This coupling of field lines on HTS tape 110B can range from angles that are perpendicular to the surface of HTS tape 110B to angles that are parallel to HTS tape 110B.

Also shown in FIG. 1 is a gap 120 between HTS tapes 110A and 110B. Note that this gap 120 exists between HTS tapes 110B and 110C as well, but is not annotated. Because gaps 120 exist, the self-induced magnetic fields are able to complete their magnetic loops. Although FIG. 1 portrays self-induced magnetic field loops 112A–C as single loops, it should be noted that there are many magnetic field loops or magnetic field lines emanating from HTS tapes 110A–C in a radial fashion away from each HTS tape 110A–C, where the field strength diminishes as one moves away from HTS tape 110A–C.

The coupling of self-induced magnetic field loop 112A on HTS tape 110B, when it is nearly perpendicular to HTS tape 110B, creates a deleterious current flow 118 in HTS tape 110B that creates heat loss. Since the electrical currents discussed are AC, this deleterious current flow 118 is also AC; hence, this loss to heat is called AC loss. Also shown is how each HTS tape 110, like HTS tape 110B with current 116B, has its self-induced magnetic field loop 112B, which couples to its nearest neighbor HTS tape 110C. Thus, this coupling of an HTS tape with its self-induced magnetic field lines (because the magnetic field is allowed to complete its magnetic loop between the HTS tapes) causes AC losses to its neighboring HTS tape.

Decreasing or eliminating the perpendicular component of the magnetic field that is created by the local self-induced magnetic field loop 112A, as shown in FIG. 1, substantially reduces AC losses. Common winding techniques allow for winding of an HTS tape of superconductor cables in a manner that causes gaps to form between the superconductors of the HTS tapes. As current flows through the HTS tapes, these gaps allow perpendicular magnetic fields to form around the HTS tapes, and these field lines penetrate into adjacent HTS tapes, and thus create AC losses. Above a given magnitude of current, called the "critical current" flowing in the superconductor, the superconductor will go normal, that is, no longer be superconducting. For currents at or less than the critical current of the superconducting material, the inventive configurations approximate a single-turn current sheet, forcing the collective fields to be mainly parallel to the surface of the superconductor winding, a preferential orientation. Therefore, with no substantial perpendicular field component; the high AC losses caused by perpendicular magnetic fields penetrating adjacent HTS tapes are eliminated in the main body of the superconducting assembly.

When transport currents are at, or less than the critical current of the superconductor, this approximates a single-turn current sheet with a constant transport current per unit of axial length along the cable, a situation that substantially minimizes the perpendicular field (with the exception of the end-turn regions). The collective magnetic field, such as loop 212 of FIG. 3, surrounding the approximated single-turn current sheet is almost completely parallel to the surface of the HTS tapes in the main body of the windings.

Figure 2:
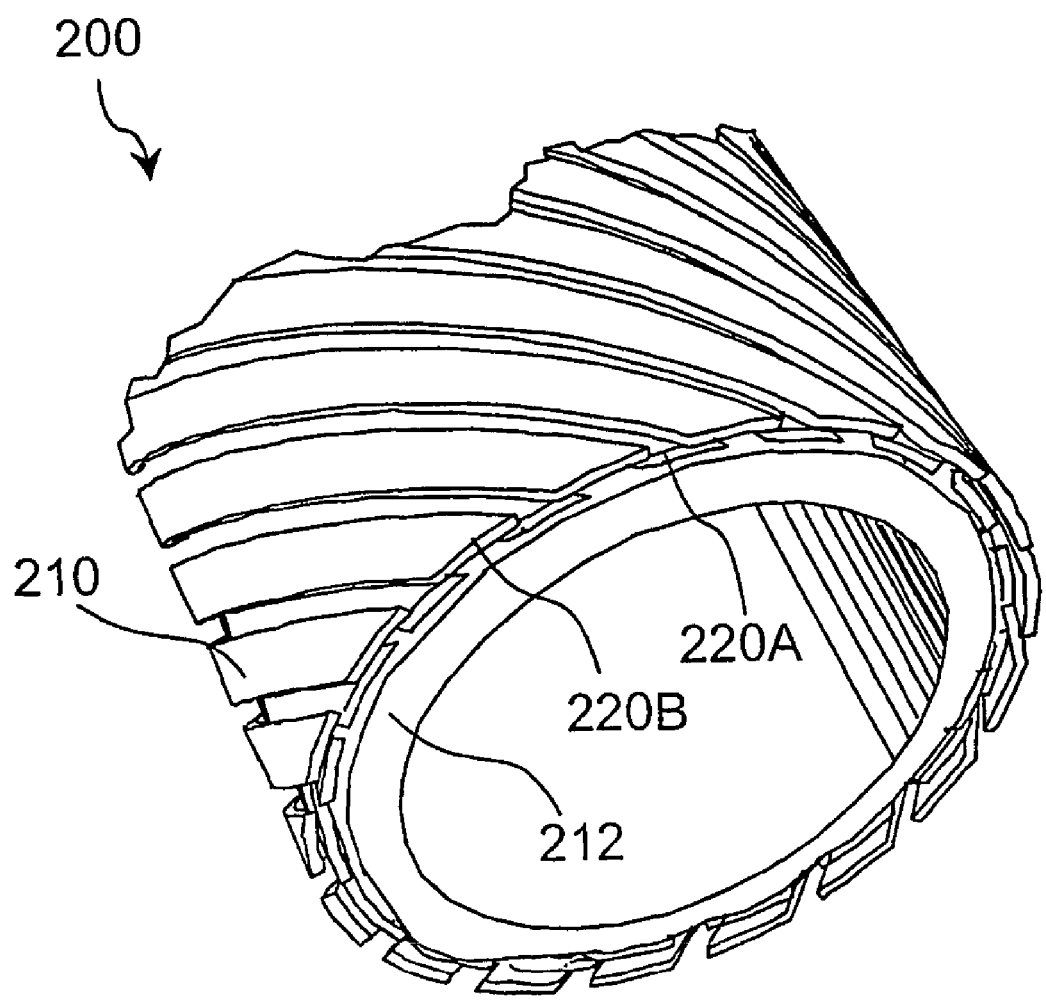
FIG. 2 is a sectional view illustrating a staggered winding configuration in a HTS tape wired cable assembly of the present invention.

A first preferred embodiment of the invention is the staggered winding embodiment. The staggered winding embodiment of the invention is described more clearly with reference to FIG. 2, which shows a sectional view of a staggered winding configuration 200 for a first embodiment of the present invention. FIG. 2 shows a first HTS tape layer 220A consisting of a plurality of HTS tapes 210 that are spirally wound in a path between about 5° and 85°, preferably from about 10° and 30°, relative to the longitudinal axis of the core 212. The application of the first HTS tape layer 220A onto the core 212 creates the gaps 120', as seen most clearly in FIG. 3. A second HTS tape layer 220B is spirally wound in a path identical to that of the first HTS tape layer 220A whereby the application of the second HTS tape layer 220B effectively covers the gaps 120' created between individual HTS tapes of the first HTS tape layer 220A.

Figure 3:
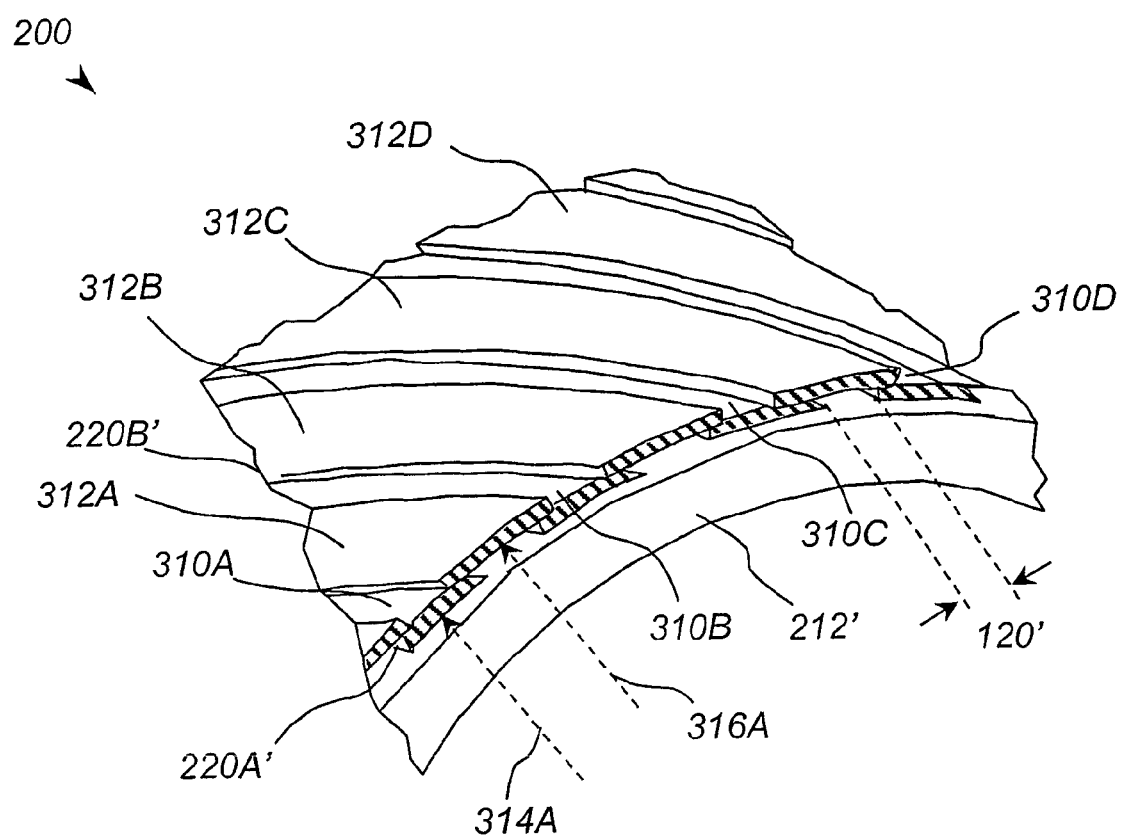
FIG. 3 is a magnified view illustrating a staggered winding configuration in a HTS tape wired cable assembly of the present invention.

FIG. 3 shows a magnified cutaway section of a staggered winding configuration 200 for a preferred embodiment of the present invention. FIG. 3 shows HTS tapes 310A–D on the core 212'. HTS tapes 310A–D are separated by spaces or gaps 120' (one is shown for demonstration purposes). HTS tapes 310A–D are shown on a first HTS tape layer 220A'. A plurality of HTS tapes 312A–312C of a second HTS tape layer 220B' are shown arranged on top of the first HTS tape layer 220A'. Each HTS tape 312A–D of second HTS tape layer 220B' overlaps gaps 120' in the first HTS tape layer 220A'. For instance, HTS tape 312C covers gap 120' between HTS tape 310C and HTS tape 310D. Current 314A shows the direction of current flow in HTS tape 310A of first HTS tape layer 220A', whereas a current 316A shows the direction of current flow in HTS tape 312A of second HTS tape layer 220B'. All current flows in identical directions in all HTS tapes at both first HTS tape layer 220A' and second HTS tape layer 220B'. A self-induced magnetic field loop is created by the current flow shown in current flow directions 314A and 316A in all HTS tapes 310A–D and all HTS tapes 312A–D, respectively.

The HTS tapes 110A–D and HTS tapes 210A–C, represented in FIG. 3, depicting an inventive device, are individual high-temperature superconductor tapes. In the figure, HTS tapes 110A–D and 210A–C are shown as flat, but suitable HTS tapes can also be elliptical, or rectangular. In FIG. 3, only two layers are shown, first HTS tape layer 330A and second HTS tape layer 330B, but it is possible to have as many layers as are required by design considerations.

Figure 4:
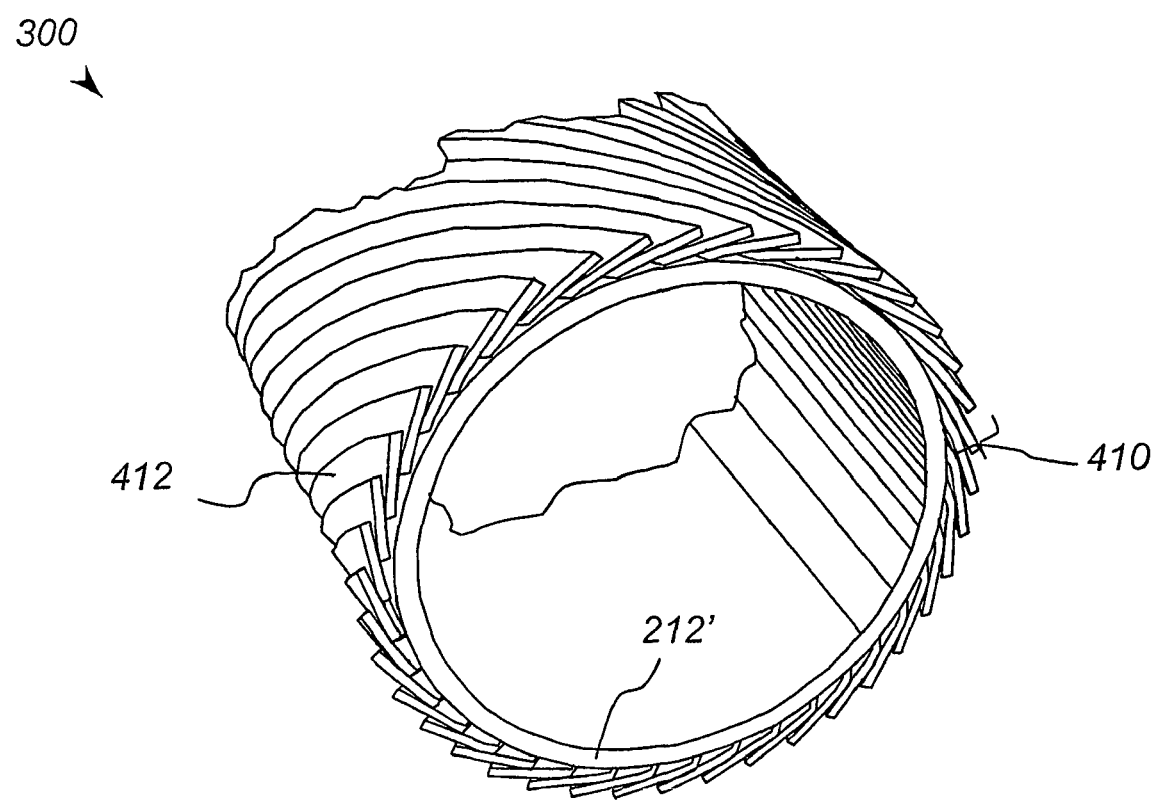
FIG. 4 is a sectional view illustrating a lapped winding configuration in a HTS tape wired cable assembly of the present invention.

In a second preferred embodiment, as shown more clearly in FIG. 4, a lapped winding configuration 300 is used. Winding an HTS tape such that one edge of the HTS tape rests on the surface of a core and the opposite edge rests on an adjacent HTS tape creates the lapped configuration.

FIG. 4 shows a sectional view of a lapped winding configuration 300 for the lapped embodiment of the present invention. FIG. 4 shows an HTS tape layer 410 consisting of a plurality of HTS tapes 412 that are spirally wound in a path between 5° and 85° relative to the longitudinal axis of the core 212'. The application of the HTS tapes 412 onto the core 212, whereby a first HTS tape underlaps a previous HTS tape and overlaps a following HTS tape, effectively covers the gaps 120', as shown in FIG. 3.

Figure 5:
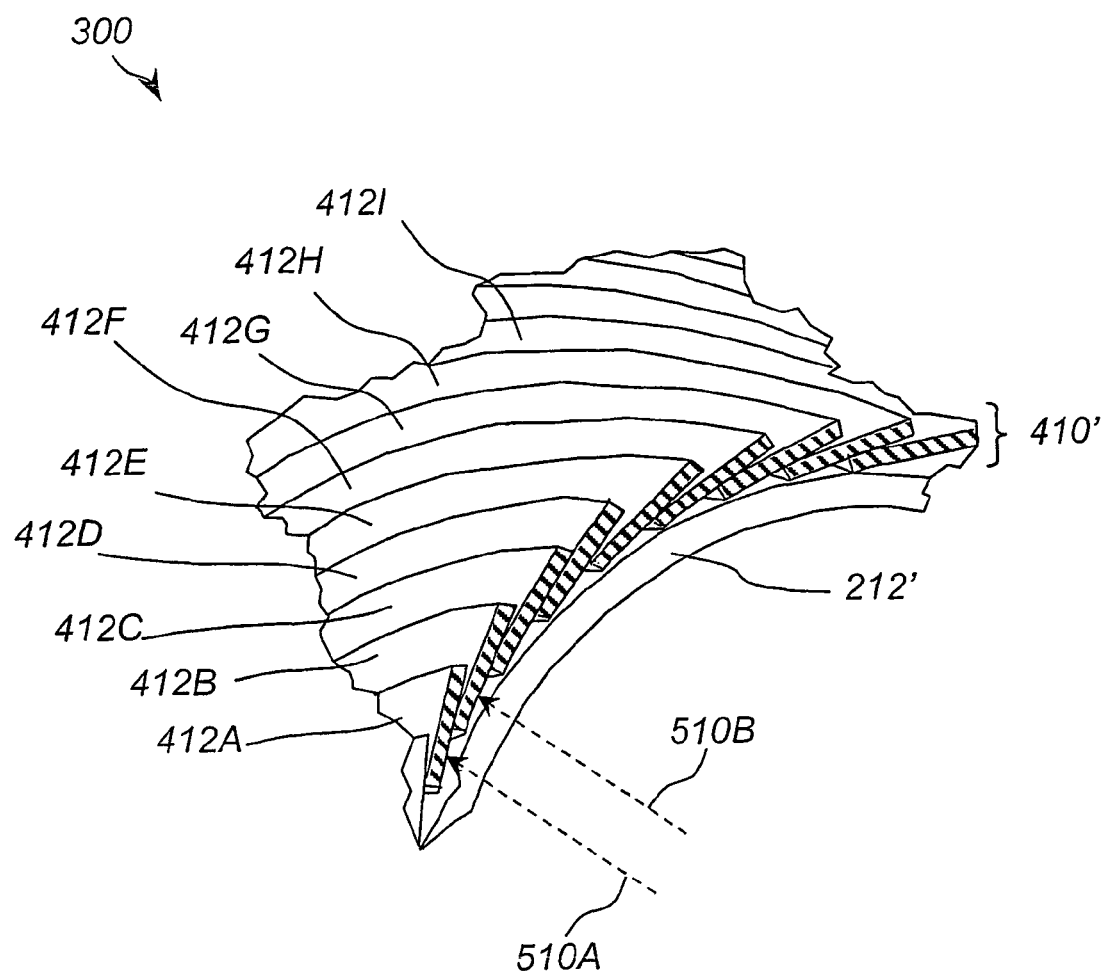
FIG. 5 is a magnified view illustrating a lapped winding configuration in a HTS tape wired cable assembly of the present invention.

As shown in FIG. 5, a plurality of HTS tapes 412A–I are wound on core 212'. A current direction 510A and a current direction 510B show the direction of current in HTS tapes 412A and 412B, respectively. Not shown are all the other current flow lines, which are all in the same direction as current directions 510A and 510B. Self-induced magnetic field loop caused by the current flow in HTS tapes 412A–I, runs mostly parallel to HTS tapes 412A–I. In this lapped winding configuration 300 there is virtually no perpendicular component to self-induced magnetic field loops for HTS tapes, and therefore no AC losses.

The winding sections of HTS tapes 412A–I, in the present embodiment, are winding sections of an individual, high-temperature superconductor tape but could be any number of tapes in parallel. Flat HTS tapes 412A–I are shown, but they may be made elliptical or rectangular.

HTS tapes 412A–I are wound around core 212' in a near-parallel path relative to the longitudinal axis of core 212'. In the present embodiment, only one HTS tape layer 410 is shown, but it is possible to have as many layers as are required by design considerations.

The invention claimed is:

1. A low alternating current loss superconducting cable comprising a plurality of superconducting tapes arranged in a single layer and spirally wound around a longitudinally extending core in a path between about 5° and 50° relative to the longitudinal axis of the core, such that the tape completely covers the longitudinal surface of the core, the plurality of superconducting tapes being generally parallel to each other and including first and second superconducting tapes adjacent each other, the first and second superconducting tapes partially overlapping each other, the second superconducting tape having first and second continuous, straight lateral edges that are parallel to each other, the first straight lateral edge of the second superconducting tape overlying the first superconducting tape.

2. The cable of claim 1 wherein the superconducting tape is selected from a member of the group consisting of cuprate based, diboride based and metallic superconducting tapes.

3. The cable of claim 1 wherein the superconducting tape is a tape selected from the group consisting of monocore, multifilament, thin film, thick film, powder-in-tube and surface-coated superconducting tapes.

4. The cable of claim 1 wherein the superconducting tape is a tape selected from the group consisting of elliptical, and rectangular superconducting tapes.

5. The cable of claim 1 wherein the superconducting tape has a thickness of from about 0,001 mm to about 10 mm thick.

6. A low alternating current loss superconducting cable as in claim 1, wherein the plurality of superconductor tapes are spirally wound in a path between about 10° and 30° relative to the longitudinal axis of the core.

7. A low alternating current loss superconducting cable, comprising a plurality of superconductor tapes, each tape being individually positioned in a first layer around a longitudinal axis and extending longitudinally with said axis, each tape being located between two immediately adjacent tapes in said first layer and having first and second continuous, straight lateral edges parallel to each other, wherein the first straight lateral edge of each tape underlaps a first associated adjacent tape and the entire length of the second straight lateral edge of each said tape overlaps a second associated adjacent tape, such that at least a minor portion of the superconductive part of the superconductor tape underlaps or overlaps an associated adjacent tape.

8. A low alternating current loss superconducting cable comprising a plurality of superconducting tapes arranged in a singe layer and spirally wound around a longitudinally extending core in a path between about 5° and 85° relative to the longitudinal axis of the core such that the tape completely covers the longitudinal surface of the core, the plurality of superconducting tapes being generally parallel to each other and including first and second superconducting tapes adjacent each other, the first and second superconducting tapes partially overlapping each other at least 25%, the second superconducting tape having first and second continuous, straight lateral edges that are parallel to each other, the entire length of the first straight lateral edge of the second superconducting tape overlying the first superconducting tape.

9. A method of fabricating low current loss superconducting cables comprising winding a cable of superconducting tape around a core, where the superconducting cable comprises a plurality of superconductor tapes, individually positioning each tape in a first layer around a longitudinal axis and extending longitudinally with said axis, locating each tape between two immediately adjacent tapes in said first layer, each tape having first and second continuous, straight lateral edges parallel to each other, wherein the first straight lateral edge of each tape underlaps a first associated adjacent tape and the second straight lateral edge of each said tape overlaps a second associated adjacent tape, such that at least a minor portion of the superconductive part of the superconductor tape underlaps or overlaps an associated adjacent tape.

10. A three phase cable consisting of three low alternating current loss superconducting cables, such cable comprising a plurality of superconductor tapes, each tape being individually positioned in a first layer around a longitudinal axis and extending longitudinally with said axis, each tape being located between two immediately adjacent tapes in said first layer and having first and second continuous, straight lateral edges parallel to each other, wherein the first straight, lateral edge of each tape underlaps a first associated adjacent tape and the entire length of the second straight lateral edge of each said tape overlaps a second associated adjacent tape, such that at least a minor portion of the superconductive part of the superconductor tape underlaps or overlaps an associated adjacent tape.

* * * * *

UNITED STATES PATENT AND TRADEMARK OFFICE
CERTIFICATE OF CORRECTION

| | |
|---|---|
| PATENT NO. | : 7,109,425 B2 |
| APPLICATION NO. | : 10/381124 |
| DATED | : September 19, 2006 |
| INVENTOR(S) | : Chandra T. Reis et al. |

Page 1 of 1

It is certified that error appears in the above-identified patent and that said Letters Patent is hereby corrected as shown below:

Col. 6, Line 54 Claim 1, line 4, "5° and 50°" should read --5° and 85°--.

Col. 7, Line 9 Claim 5, line 2, "about 0,001 mm" should read --about 0.001 mm--.

Signed and Sealed this

Eighteenth Day of December, 2007

JON W. DUDAS
*Director of the United States Patent and Trademark Office*